（12）United States Patent
Poulin et al.

(10) Patent No.: US 11,572,067 B2
(45) Date of Patent: Feb. 7, 2023

(54) USING ISA SYSTEM TO DECELERATE TRUCK UPON ENTERING GEOFENCED AREA

(71) Applicant: 7980302 Canada Inc., Montreal (CA)

(72) Inventors: Jean Poulin, Varennes (CA); George Bassily, Laval (CA); Mathieu Boivin, Mount Royal (CA); Gabriel Paquin Lefebvre, Montreal (CA)

(73) Assignee: 7980302 Canada Inc., Montreal (CA)

( * ) Notice: Subject to any disclaimer, the term of this patent is extended or adjusted under 35 U.S.C. 154(b) by 133 days.

(21) Appl. No.: 17/004,661

(22) Filed: Aug. 27, 2020

(65) Prior Publication Data

US 2021/0061273 A1 Mar. 4, 2021

Related U.S. Application Data

(60) Provisional application No. 62/894,218, filed on Aug. 30, 2019.

(51) Int. Cl.
 B60W 30/14 (2006.01)
 B60W 30/09 (2012.01)
 H04W 4/021 (2018.01)
 G08G 1/00 (2006.01)
 G01C 21/34 (2006.01)

(52) U.S. Cl.
 CPC .......... B60W 30/146 (2013.01); B60W 30/09 (2013.01); G01C 21/3461 (2013.01); G08G 1/20 (2013.01); H04W 4/021 (2013.01)

(58) Field of Classification Search
 CPC .. B60W 30/146; B60W 30/09; B60W 50/087; B60W 2552/00; B60W 2555/60; B60W 2556/50; G08G 1/20; H04W 4/021
 See application file for complete search history.

(56) References Cited

U.S. PATENT DOCUMENTS 6,778,074 B1 8/2004 Cuozzo
7,184,873 B1 2/2007 Idsinga et al.
(Continued)

FOREIGN PATENT DOCUMENTS

CA 2610548 5/2015
CA 2768484 6/2019
(Continued)

OTHER PUBLICATIONS

Machine translation of JP 60163735 A retrieved from JPatPlat on Jun. 30, 2022, 10 pages.
(Continued)

*Primary Examiner* — Jason Holloway
(74) *Attorney, Agent, or Firm* — Tillman Wright, PLLC; Chad D. Tillman

(57) ABSTRACT

A method of decelerating a vehicle upon entering a halt zone includes determining a location of a vehicle at routine intervals while the vehicle is traveling along a road; determining when the vehicle enters a halt zone; and upon determining that the vehicle has entered a halt zone, limiting a speed of the vehicle to a nominal speed. The method preferably is performed by an intelligent speed adaptor (ISA) system of a vehicle. The vehicle preferably is part of a fleet of commercial vehicles, and a fleet manager preferably is notified when a vehicle has entered a halt zone.

15 Claims, 10 Drawing Sheets

(56) References Cited

U.S. PATENT DOCUMENTS

| | | |
|---|---|---|
| 7,457,693 B2 | 11/2008 | Olsen et al. |
| 8,000,877 B2 | 8/2011 | Aussillou |
| 8,330,620 B2 | 12/2012 | Swoboda et al. |
| 8,751,133 B2 | 6/2014 | Poulin |
| 9,240,018 B2 | 1/2016 | Ricci |
| 9,396,656 B2 | 7/2016 | Cazanas et al. |
| 9,630,590 B2 | 4/2017 | Doherty et al. |
| 9,971,348 B1 | 5/2018 | Canavor et al. |
| 10,373,257 B1 | 8/2019 | Iqbal et al. |
| 10,388,161 B2 | 8/2019 | Troutman et al. |
| 10,392,023 B2 | 8/2019 | Maskell et al. |
| 10,593,205 B1 * | 3/2020 | Jones .................. G01C 21/3461 |
| 2001/0003808 A1 | 6/2001 | Jeon |
| 2002/0065599 A1 | 5/2002 | Hameleers et al. |
| 2004/0212506 A1 | 10/2004 | Cherouny et al. |
| 2006/0081697 A1 | 4/2006 | Brinton et al. |
| 2007/0168125 A1 | 7/2007 | Petrik |
| 2008/0270519 A1 | 10/2008 | Ekdahl et al. |
| 2011/0137520 A1 | 6/2011 | Rector et al. |
| 2011/0160978 A1 | 6/2011 | Yuzawa et al. |
| 2012/0215416 A1 * | 8/2012 | Poulin .................. B60W 30/146 701/93 |
| 2012/0283928 A1 | 11/2012 | Bjernetun et al. |
| 2013/0157647 A1 | 6/2013 | Kolodziej |
| 2013/0164715 A1 | 6/2013 | Hunt et al. |
| 2014/0046585 A1 | 2/2014 | Morris, IV et al. |
| 2014/0282917 A1 | 9/2014 | Peckover |
| 2015/0120178 A1 * | 4/2015 | Kleve .................... G01C 21/32 701/408 |
| 2015/0246676 A1 | 9/2015 | Keren |
| 2015/0355637 A1 | 12/2015 | Morisset |
| 2017/0068245 A1 | 3/2017 | Scofield et al. |
| 2018/0130095 A1 | 5/2018 | Khoury |
| 2018/0210446 A1 | 7/2018 | Canavor et al. |
| 2018/0308295 A1 | 10/2018 | Kwak |
| 2018/0357841 A1 | 12/2018 | McQuade |
| 2019/0016341 A1 | 1/2019 | Nelson |
| 2019/0339692 A1 | 11/2019 | Sakai et al. |
| 2020/0104790 A1 | 4/2020 | Chung |
| 2020/0156630 A1 * | 5/2020 | Schmidt ............ B60W 30/0956 |
| 2020/0294401 A1 * | 9/2020 | Kerecsen ............. G05D 1/0287 |
| 2021/0031765 A1 | 2/2021 | Poulin et al. |
| 2021/0031782 A1 | 2/2021 | Poulin et al. |
| 2021/0387629 A1 | 12/2021 | Lefebvre |

FOREIGN PATENT DOCUMENTS

| | | |
|---|---|---|
| JP | S0163735 A | 8/1985 |
| WO | 2006015425 A1 | 2/2006 |
| WO | 2019043446 A1 | 3/2019 |

OTHER PUBLICATIONS

Transtex "E-Smart" Marketing Flyer http://transtex-llc.com/wp-content/uploads/2018/06/Transtex-MKTG-Flyer-E-SMART-Combo-Web-20180618.pdf. Published on the Internet by Transtex Jul. 23, 2018, 2 pages.

* cited by examiner

USING ISA SYSTEM TO DECELERATE TRUCK UPON ENTERING GEOFENCED AREA

CROSS-REFERENCE TO RELATED APPLICATION

The present application is a nonprovisional of, and claims the benefit under 35 U.S.C. § 119(e) to, U.S. provisional patent application 62/894,218, filed Aug. 30, 2019, the disclosure of which is incorporated herein by reference.

BACKGROUND OF THE INVENTION

The present invention generally relates to electronic speed management systems for vehicles that are designed to further compliance by drivers with speed limits. The vehicle may be a motor vehicle such as, for example, an automobile, truck, or semi-truck. It is further contemplated that at least some embodiments of the present invention have utilization with not only motor vehicles but also electric vehicles.

Within this context, FIG. 1 is a schematic representation of an exemplary electronic network 100 of a motor vehicle. The network 100 preferably is a controller area network (CAN) comprising a data bus 102 and a plurality of electronic control units (ECUs) 104 connected to the data bus for electronic communications between the ECUs.

Each ECU defines a node of the network, and the complexity of the node can range from a simple I/O device to an embedded computer with a CAN interface and sophisticated software. A node also may comprise a gateway enabling other electronic devices to communicate over a port, such as a USB or Ethernet port, to the devices on the CAN network. Such other electronic devices may comprise, for example, wireless communication interfaces, including cellular communications, for wirelessly communicating with servers and other computing devices connected to the Internet. This enables real time communications between one or more nodes of the controller area network of the vehicle and a remotely located computer, such as a server. This is represented, for example, in FIG. 2 by wireless communication device and antennae 70.

The data bus 102 connecting the nodes may comprise two wires as schematically seen in FIG. 1 and preferably comprises a twisted pair in actual implementation.

A vehicle commonly has a large number of ECUs connected by the data bus 102. Communications utilizing basic CAN protocols are preferred but other higher-level protocols and network technologies are contemplated, including by way of example and not limitation CAN FD, CAN OPEN, OBD2, and SAE J1939, J1708, as well as other communications protocols and technologies whether invented or hereinafter arising. In its broadest scope, the invention is not limited by any specific protocol or network technology, although preferred embodiments preferably are implemented using one or more of the aforementioned technologies. Of the ECUs present in a vehicle, there is generally a powertrain control module (PCM), which traditionally has been referred to as an engine control module (ECM) or engine control unit because such unit controls engine functions such as spark timing, fuel mixture, and emissions. PCM has become a more descriptive term because the PCM on many vehicles also controls the transmission, which is part of the powertrain. In contrast, a transmission control module (TCM) usually is a separate control module responsible for the transmission. The TCM interacts with the PCM/ECM for transmission shifting at appropriate speeds and loads. There also typically is a body control module (BCM)—another major module handling multiple tasks ranging from lighting and other electrical accessories to climate control, keyless entry, anti-theft duties and managing communications between other modules. The functions and specific modules in a vehicle can vary greatly depending on the year, make and model of vehicle, and even its list of options. As used herein a generic reference to a "main control module" or MCM refers to that module in a vehicle which is responsible for and controls engine operations based on communications and can be used to control acceleration or speed of the vehicle. The MCM commonly will be the PCM or ECM.

Other ECUs include: ABS/traction control/stability control modules; airbag (SRS) modules; alarm modules (or chime modules) for anti-theft system; cruise control modules; electronic steering modules; fuel pump control modules; injector driver modules; instrument cluster control modules; keyless entry modules; lighting modules; remote start/immobilizer modules; suspension control modules; transfer case modules for four-wheel drives; wiper motor control modules; and vehicle communication modules. There also can be modules for power windows, power seats, heated/cooled seats, power sliding doors, door locks, sunroofs, and air flow control doors inside the heating ventilation air conditioning (HVAC) system. These are only representative, and many more types of modules exist. Generally speaking, controllers, sensors and actuators typically are or form part of the types of devices connected by a controller area network 100. Indeed, it is contemplated that a node of a controller area network may comprise a subsystem of devices each having one or more electronic or electromechanical components, that a node may consist of a single such component, or any combination thereof.

Additionally, many vehicles now have advanced driver assistance (ADA) systems, which may be OEM or after market. Some ADA systems manage braking, such as collision mitigation systems, and others manage speed. Those that manage speed often are referred to as intelligent speed adaptor (ISA) systems—or sometimes as intelligent speed adaptation systems or intelligent speed assistance systems. ISA systems are in-vehicle systems that commonly are intended and used to increase speed-limit compliance by drivers.

There are three general categories of ISA systems: open ISA systems; half-open ISA systems; and closed ISA systems. Open ISA systems provide an alert (visible and/or audible) to a driver when a speed limit is exceed and rely upon the driver to decrease the vehicle's speed; half-open ISA systems provide an alert and also temporarily limit the vehicle's capability to exceed the speed limit or make it more difficult to exceed the speed limit by the driver, such as by increasing the force countering depression of an accelerator pedal by a driver; and closed ISA systems limit the speed automatically, overriding a driver's actions causing the speeding, such as by controlling fuel delivery, or by altering acceleration control signals that are sent from an acceleration pedal to an electronic throttle controller and/or to the ECM.

Basic ISA systems limit speed of a vehicle to a preset maximum speed independent of extraneous factors including location of the vehicle. The more advanced ISA systems use information regarding location of the vehicle and a speed limit in force at such location in limiting the vehicle's speed to the then current speed limit. Advanced ISA systems may identify dynamic speed limits and limit a vehicle's speed to the then current speed limit for a given time at a given location. Dynamic speed limits may change based on time-dependent factors such as traffic flow and weather conditions. Information can be obtained in advanced ISA systems through use of digital maps incorporating roadway coordinates as well as from databases containing speed limits for road segments in a geographical area, or through other technologies such as optical recognition technology that detects and interprets roadside speed limit signage.

Advanced ISA systems thus assists a driver in keeping to the lawful speed limits at all times, particularly as the vehicle travels through different speed zones. This is particularly useful when drivers are in unfamiliar areas or when they pass through areas where dynamic speed limits are in use. GPS-based ISA systems are believed to be perhaps the most effective ISA systems. In such a system, a GPS device detects a vehicle's current location which information is then used to determine the applicable speed limit from, for example, a preloaded database.

A particular ISA system for limiting the maximum speed of a motor vehicle is disclosed in U.S. Pat. No. 8,751,133 to Poulin, the disclosure of which is incorporated herein by reference. An embodiment in accordance with the disclosure of the '133 Patent is illustrated in FIG. 2. In this embodiment, an actual throttle sensor signal from the throttle position sensor to the engine control unit is modified by a speed controller or intelligent speed limiter (ISL) 20 in order to prevent the user from driving the vehicle at a speed beyond the actual allowed maximum speed limit. By modifying the throttle sensor signal, when appropriate, the ISL module 20 is able to cause the speed of the vehicle to decrease when the speed limit is exceeded.

With reference to FIG. 2, the ISA system comprises a number of modules defining nodes of the controller area network including: a user identification device 12 for identifying a driver of the vehicle; a navigation device 14, such as a navigation device including global positioning system (GPS) capabilities for determining a position of the vehicle on a road map (map matching); and a speed limit database 16 or cartography database of posted speed limits for respective segments of roads of the map, which database 16 may be updated in real time or provided from an external provider over wireless communications. These components are connected for communications with the ISL module 20, which executes an allowed maximum speed algorithm. The allowed maximum speed algorithm determines in real time an actual allowed maximum speed limit by adding the posted speed limit of the actual road segment, obtained by map matching (matching the GPS data with the speed limit database), to the corresponding user over-speed parameter.

The user identification device 12 includes a data input interface to receive a user identification code from the driver, either via a keypad 32 (user identification and/or password) or a wireless device 32' (RFID—radio frequency identification) worn by the driver, or the like.

The ISL module 20 also preferably has access to a user database 18 typically including, for each user, a respective user over-speed parameter corresponding to each respective road segment, which parameter could be provided for different types of roads or could be dependent on the corresponding posted speed limits, typically provided in the form of a driver speed profile table or the like.

The ISL module 20 further communicates with: a main control module of the vehicle comprising an engine control module 22; a vehicle speed source 24, such as a vehicle speed sensor; and a throttle position sensor (TPS) 26. When the vehicle speed determined from the vehicle speed source 24 is within a predetermined activation range below the actual allowed maximum speed limit, the controller module 20 modifies the actual throttle sensor signal that is sent from the throttle position sensor 26 to the main control module 22 so as to prevent the driver from driving the vehicle at a speed in excess of the currently allowed speed limit.

Optionally, a customized cartography databases 30 including speed limits could be incorporated into the ISL module 20.

It will be apparent to the Ordinary Artisan that in a CAN network, all nodes receive the communications sent and that in the ISA system of FIG. 2, the ISL module 20 and the main control module 22 each form a node of the controller area network of the vehicle. The throttle position sensor 26 and vehicle speed source 24 also constitute nodes. In order to modify the actual throttle sensor signal that is sent from the throttle position sensor 26 to the main control module 22 so as to prevent the driver from driving the vehicle at a speed in excess of the currently allowed speed limit, the ISL module 20 controls the signals sent by the throttle position sensor 26. This is schematically represented by control line 23.

An alternative embodiment of the ISA system in accordance with the disclosure of the '133 Patent is illustrated in FIG. 3. In this embodiment, the throttle position sensor module 26 preferably is coupled for communication with the ISL module 20 rather than the CAN bus so that the signals sent from the throttle position sensor 26 are not received by the main control module 22 until after the ISL module 20 has had the opportunity to modify such signals, if necessary, in order to reduce the speed of the vehicle or limit acceleration of the vehicle so as not to exceed the maximum allowed speed.

The aforementioned embodiments of the ISA system of the '133 Patent need to function to prevent speeding regardless of whether cruise control is engaged by a driver; cruise control cannot be permitted to be a workaround for speeding.

Cruise control functionality is provided by a cruise control module 28 that ordinarily would be coupled in communication with the main control module 22 via the CAN bus. FIG. 2 is representative of this arrangement.

In one embodiment, in order for the ISA system to function with the intended effect even when cruise control is engaged, the ISL module 20 takes over control of the cruise control module 28 and allows the setting of the cruise control only at a vehicle speed at or below the actual allowed maximum speed limit and prevents the setting of the cruise control at any vehicle speed above the actual allowed maximum speed limit. This embodiment is represented in FIG. 2, and such control is schematically represented by control line 25 therein.

In FIG. 3, the cruise control module 28 is coupled for communication with the ISL module 20 rather than the CAN bus so that the signals sent from the control module 28 are not received by the main control module 22 until after the ISL module 20 has had the opportunity to modify such signals, if necessary, which is similar to the arrangement of the throttle position sensor module 26. Thus, in both embodiments of FIGS. 2 and 3, a driver is prevented from exceeding the maximum allowed speed using cruise control.

While suitable for its intended purposes, embodiments of the ISA system disclosed in the '133 Patent can be commercially difficult to implement due to the required interactions between the ISL module 20 and the cruise control module 28. In particular, there are many different manufacturers and models of cruise control modules, each module of which can vary significantly in its operation and control.

Each manufacturer and model thus need to be taken into consideration in either of the implementations of the ISA system of FIGS. 2 and 3.

Accordingly, improvements in utilization of the ISA system of the '133 Patent—and in other similar ISA systems—have been made which improvements lessen or even obviate the necessity to consider the manufacturer or model of a cruise control module that is utilized in a given vehicle while still enabling the ISA system to properly function when the cruise control is engaged. In other words, certain ISA systems now are agnostic in their operation. Such systems are disclosed, for example, in U.S. patent application 62/881,934, the disclosure of which is incorporated herein by reference.

In addition to the foregoing, it should be pointed out that embodiments of the ISA system in accordance with the disclosure of the '133 Patent do in fact additionally provide security features. Specifically, the ISA system may prevent a vehicle from being moved by preventing the starting of the vehicle engine in the absence of a valid user identification. Additionally, or alternatively, the ISA system may prevent a vehicle from being moved by preventing a signal from the throttle position sensor 26 from being sent to the engine control unit 22. Such security features of an ISA system are advantageous, especially in view of the fact that these are byproducts of the design of the ISA system and do not accomplish the principal intent of the ISA system of speed-limit compliance by drivers.

Further security features or other benefits of ISA systems also have been realized by repurposing use of ISA systems as disclosed, for example, in U.S. patent application 62/881,935, the disclosure of which is incorporated by reference herein. Such extension of the utility of ISA systems is considered advantageous.

The present invention relates to yet further extension of the utility that may be provided by ISA systems, whether that of the '133 Patent or otherwise. In particular, it is believed that it would be advantageous to repurpose ISA systems to cause vehicles incorporating such systems to decelerate when entering a geofenced area and, specifically, to essentially cause these vehicles to come to a halt by setting the speed for these vehicles in such geofenced areas to a nominal speed (e.g., to a speed corresponding to idling of the engine, to a speed of around one mile per hour or one kilometer per hour, or to an absolute minimum speed allowed by the particular ISA system).

SUMMARY OF THE INVENTION

The present invention includes many aspects and features. Moreover, while many aspects and features relate to, and are described in the context of, ADA systems and ISA systems in particular, the present invention also has utility outside of such systems, as will become apparent to the Ordinary Artisan from the disclosure herein.

In a first aspect, of the invention, a vehicle comprises an intelligent speed adaptor (ISA) system that is configured both to limit a speed of the vehicle traveling along a road to a maximum speed determined based on a currently allowed speed for a speed zone of the road along which the vehicle is traveling, whereby the vehicle does not exceed a safe speed while traveling along the road within the speed zone; and to limit the speed of the vehicle to a nominal speed upon the vehicle traveling along the road into a halt zone, whereby the vehicle is caused by the ISA system to decelerate upon entering the halt zone.

In a feature, the ISA system determines a location of the vehicle based on GPS coordinates of the vehicle and wherein the halt zone comprises a geofenced area that is defined by GPS coordinates, whereby the ISA system determines when the vehicle enters the halt zone. The ISA system preferably monitors a location of the vehicle for determining when the vehicle enters the halt zone.

In a feature, the halt zone comprises a geofenced area along a road that leads to an overpass which the vehicle is unable to traverse, whereby damage or injury from a collision of the vehicle with the overpass may be prevented or at least mitigated.

In a feature, the halt zone comprises a geofenced area along a road that leads to a low-clearance structure such that the ISA system will cause the vehicle to automatically decelerate upon entering the halt zone, whereby damage or injury from a collision of the vehicle with the lower-clearance structure may be prevented or at least mitigated.

In a feature, the halt zone comprises a geofenced area along a road that leads to an overpass such that the ISA system will cause the vehicle to halt upon entering the halt zone prior to reaching an entrance of the overpass.

In a feature, the halt zone comprises a geofenced area along a road that leads to a tunnel such that the ISA system will cause the vehicle to halt upon entering the halt zone prior to reaching an entrance of the tunnel.

In a feature, the ISA system causes the vehicle to halt upon entering the halt zone.

In a feature, the ISA system is configured to limit the speed of the vehicle to a nominal speed upon the vehicle entering each of a plurality of different halt zones.

In a feature, the nominal speed is a speed that results from disengagement and nonoperation of the accelerator of the vehicle.

In a feature, the nominal speed is 1 kilometer per hour.

In a feature, the nominal speed is 1 mile per hour.

In a feature, the nominal speed is 5 miles per hour or less.

In a feature, the nominal speed corresponds to idling of the engine.

In a feature, the nominal speed is a speed at which the vehicle, when under heavy load, will not advance forward.

In a feature, the ISA system causes the vehicle to decelerate by preventing signals indicating an acceleration from being sent to a main control module comprising an engine control unit of the vehicle.

In a feature, the ISA system causes the vehicle to decelerate by preventing signals sent in response to depression of an acceleration pedal from being received by an engine control unit of the vehicle.

In a feature, the ISA system causes the vehicle to decelerate by modifying signals that are sent in response to depression of an acceleration pedal to an engine control unit of the vehicle.

In a feature, the ISA system causes the vehicle to decelerate by preventing signals sent by a throttle position sensor from being received by an engine control unit of the vehicle.

In a feature, the ISA system causes the vehicle to decelerate by modifying signals sent by a throttle position sensor to an engine control unit of the vehicle.

In a feature, the ISA system causes the vehicle to decelerate by sending commands to an engine control unit of the vehicle setting the vehicle's top speed governor to the nominal speed.

In a feature, the ISA system limits the speed of the vehicle by disengaging an acceleration pedal of the vehicle.

In a feature, the ISA system decelerates the vehicle by signaling an engine control module of the vehicle that the accelerator is not depressed.

In a feature, the ISA system causes actuation of brakes of the vehicle for active braking of the vehicle rather than engine braking of the vehicle.

In another feature, the halt zone comprises a geofenced area comprising a vehicular path located adjacent a government building.

In another feature, the halt zone comprises a geofenced area comprising a pedestrian path.

In another feature, the halt zone comprises a geofenced area comprising an area of a military base.

In another feature, the halt zone comprises a geofenced area comprising an area of an airport.

In another aspect of the invention, a method of decelerating a vehicle upon entering a halt zone comprises the steps of determining a location of a vehicle at routine intervals while the vehicle is traveling along a road, determining when the vehicle enters a halt zone, and upon determining that the vehicle has entered a halt zone, and limiting a speed of the vehicle to a nominal speed.

In a feature, the halt zone comprises a geofenced area defined by GPS coordinates, wherein the location of the vehicle is determined based on GPS coordinates of the vehicle, and wherein the vehicle is determined to enter a halt zone when the GPS coordinates of the vehicle are within the geofenced area.

In a feature, the method is performed by an intelligent speed adaptor (ISA) system of the vehicle.

In a feature, the method is performed for a plurality of different halt zones.

In a feature, a halt zone comprises an area of a road leading up to an overpass.

In a feature, a halt zone comprises an area of a road leading up to a tunnel.

In a feature, the nominal speed is a speed that results from disengagement and nonoperation of the accelerator of the vehicle.

In a feature, the nominal speed is 1 kilometer per hour.

In a feature, the nominal speed is 1 mile per hour.

In a feature, the nominal speed is 5 miles per hour or less.

In a feature, the nominal speed corresponds to idling of the engine.

In a feature, the nominal speed is a speed at which the vehicle, when under heavy load, will not advance forward.

In a feature, the vehicle is an automobile.

In a feature, the vehicle is a delivery truck.

In a feature, the vehicle is a semi-truck.

In a feature, the vehicle is an electric vehicle.

In another feature, the vehicle is an automobile.

In another feature, the vehicle is a delivery truck.

In another feature, the vehicle is a semi-truck.

In another feature, the vehicle is an electric vehicle.

In another feature, the method further comprises immobilizing the vehicle after decelerating the vehicle upon entering the halt zone.

In another feature, the method further comprises sending a notification that the vehicle has entered the halt zone upon determining that the vehicle has entered the halt zone. The notification preferably comprises a text message or an email.

In another feature, the vehicle is part of a fleet of commercial vehicles, and the notification is sent to a fleet manager upon the vehicle entering the halt zone.

Additional features are found in the incorporated disclosures of the provisional applications identified above.

In addition to the aforementioned aspects and features of the present invention, it should be noted that the present invention further encompasses the various logical combinations and subcombinations of such aspects and features. Thus, for example, claims in this or a divisional or continuing patent application or applications may be separately directed to any aspect, feature, or embodiment disclosed herein, or combination thereof, without requiring any other aspect, feature, or embodiment.

BRIEF DESCRIPTION OF THE DRAWINGS

One or more preferred embodiments of the present invention now will be described in detail with reference to the accompanying drawings, wherein the same elements are referred to with the same reference numerals, and wherein.

DETAILED DESCRIPTION

Figure 1:
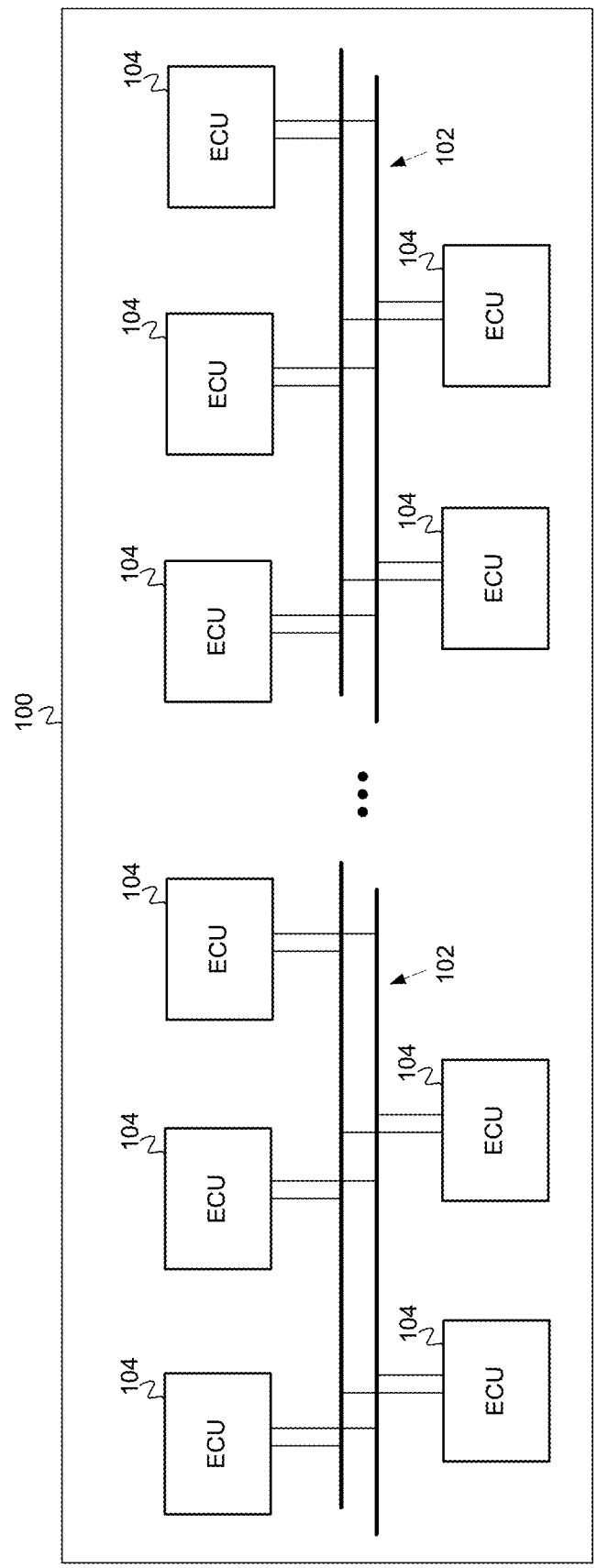
FIG. 1 is a schematic illustration of a prior art electronic network of a motor vehicle.

As a preliminary matter, it will readily be understood by one having ordinary skill in the relevant art ("Ordinary Artisan") that the invention has broad utility and application. Furthermore, any embodiment discussed and identified as being "preferred" is considered to be part of a best mode contemplated for carrying out the invention. Other embodiments also may be discussed for additional illustrative purposes in providing a full and enabling disclosure of the invention. Furthermore, an embodiment of the invention may incorporate only one or a plurality of the aspects of the invention disclosed herein; only one or a plurality of the features disclosed herein; or combination thereof. As such, many embodiments are implicitly disclosed herein and fall within the scope of what is regarded as the invention.

Accordingly, while the invention is described herein in detail in relation to one or more embodiments, it is to be understood that this disclosure is illustrative and exemplary of the invention and is made merely for the purposes of providing a full and enabling disclosure of the invention. The detailed disclosure herein of one or more embodiments is not intended, nor is to be construed, to limit the scope of patent protection afforded the invention in any claim of a patent issuing here from, which scope is to be defined by the claims and the equivalents thereof. It is not intended that the scope of patent protection afforded the invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the invention. Accordingly, it is intended that the scope of patent protection afforded the invention be defined by the issued claim(s) rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

With regard solely to construction of any claim with respect to the United States, no claim element is to be interpreted under 35 U.S.C. 112(f) unless the explicit phrase "means for" or "step for" is actually used in such claim element, whereupon this statutory provision is intended to and should apply in the interpretation of such claim element. With regard to any method claim including a condition precedent step, such method requires the condition precedent to be met and the step to be performed at least once but not necessarily every time during performance of the claimed method.

Furthermore, it is important to note that, as used herein, "comprising" is open-ended insofar as that which follows such term is not exclusive. Additionally, "a" and "an" each generally denotes "at least one" but does not exclude a plurality unless the contextual use dictates otherwise. Thus, reference to "a picnic basket having an apple" is the same as "a picnic basket comprising an apple" and "a picnic basket including an apple", each of which identically describes "a picnic basket having at least one apple" as well as "a picnic basket having apples"; the picnic basket further may contain one or more other items beside an apple. In contrast, reference to "a picnic basket having a single apple" describes "a picnic basket having only one apple"; the picnic basket further may contain one or more other items beside an apple. In contrast, "a picnic basket consisting of an apple" has only a single item contained therein, i.e., one apple; the picnic basket contains no other item.

When used herein to join a list of items, "or" denotes "at least one of the items" but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers"; the picnic basket further may contain one or more other items beside cheese and crackers.

When used herein to join a list of items, "and" denotes "all of the items of the list". Thus, reference to "a picnic basket having cheese and crackers" describes "a picnic basket having cheese, wherein the picnic basket further has crackers", as well as describes "a picnic basket having crackers, wherein the picnic basket further has cheese"; the picnic basket further may contain one or more other items beside cheese and crackers.

The phrase "at least one" followed by a list of items joined by "and" denotes an item of the list but does not require every item of the list. Thus, "at least one of an apple and an orange" encompasses the following mutually exclusive scenarios: there is an apple but no orange; there is an orange but no apple; and there is both an apple and an orange. In these scenarios if there is an apple, there may be more than one apple, and if there is an orange, there may be more than one orange. Moreover, the phrase "one or more" followed by a list of items joined by "and" is the equivalent of "at least one" followed by the list of items joined by "and".

Referring now to the drawings, one or more preferred embodiments of the invention are next described. The following description of one or more preferred embodiments is merely exemplary in nature and is in no way intended to limit the invention, its implementations, or uses.

Figure 3:
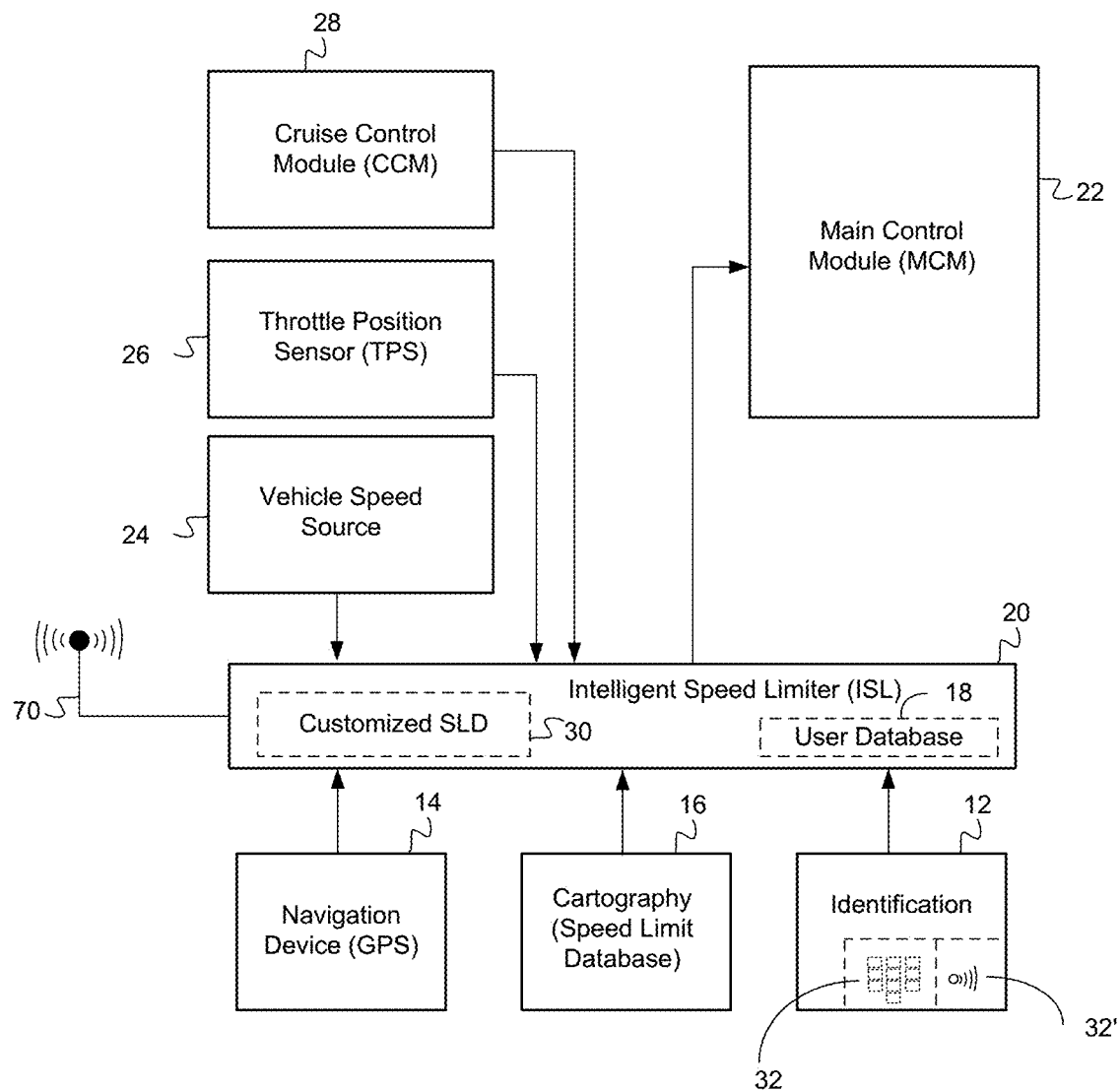
FIG. 3 is a schematic illustration of another embodiment of a prior art ISA system in accordance with the disclosure of the '133 Patent.
Figure 4:
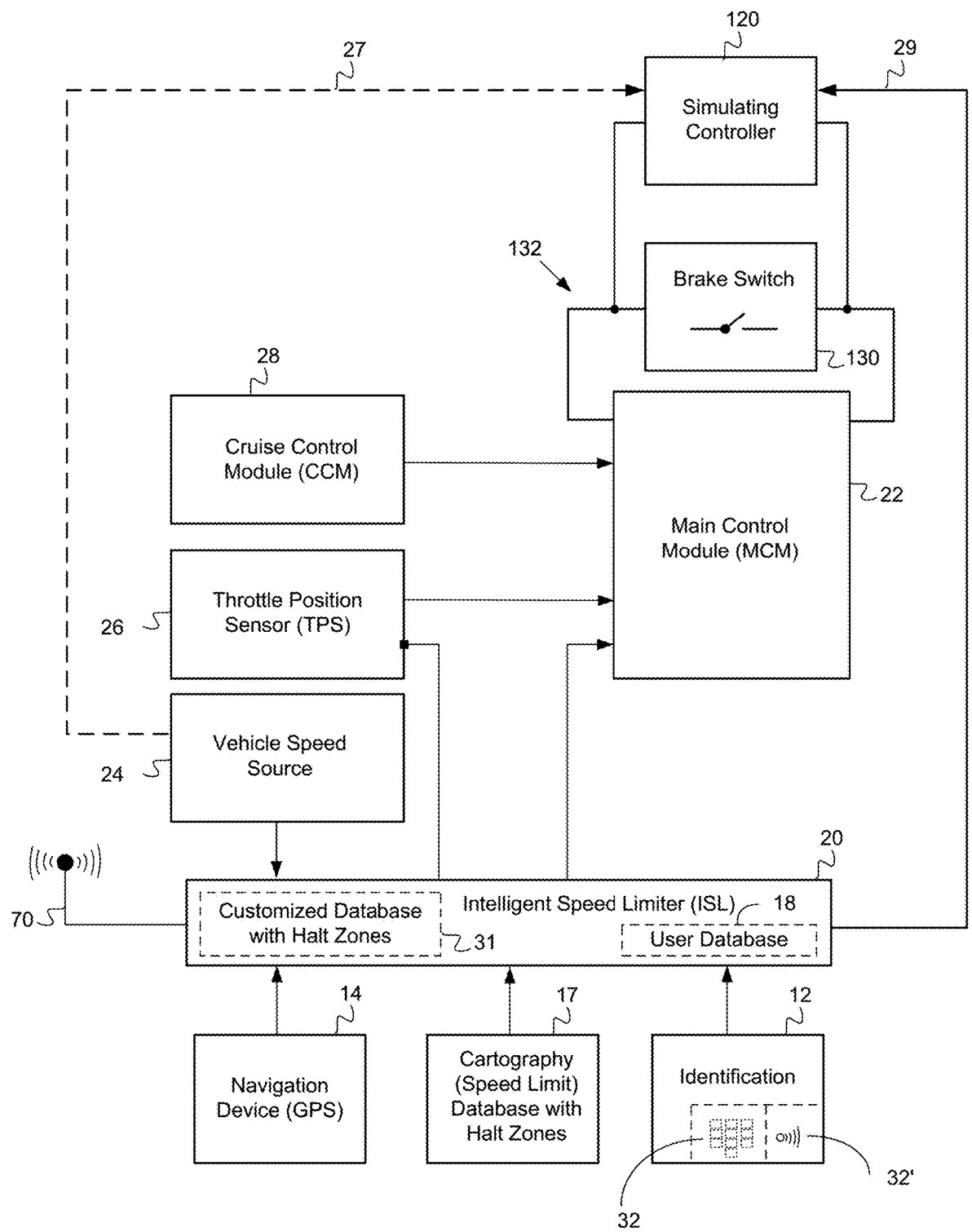
FIG. 4 is a schematic illustration of an embodiment of an ISA system that may be utilized in accordance with one or more aspects and features of the present invention.

FIG. 4 is a schematic illustration of an embodiment of an ISA system in accordance with one or more aspects and features of the present invention. The embodiment of FIG. 4 includes many of the same elements as the ISA system of FIGS. 2 and 3, including an identification device 12 for identifying a driver; a navigation device (e.g. GPS device) 14; a user database 18 of drivers; an intelligent speed limiter (ISL) module 20; a main control module (MCM) 22; a vehicle speed source 24; a throttle position sensor (TPS) module 26; and a cruise control module 28. A keypad 32; and a wireless RFID reader 32' also may be included as shown.

Figure 2:
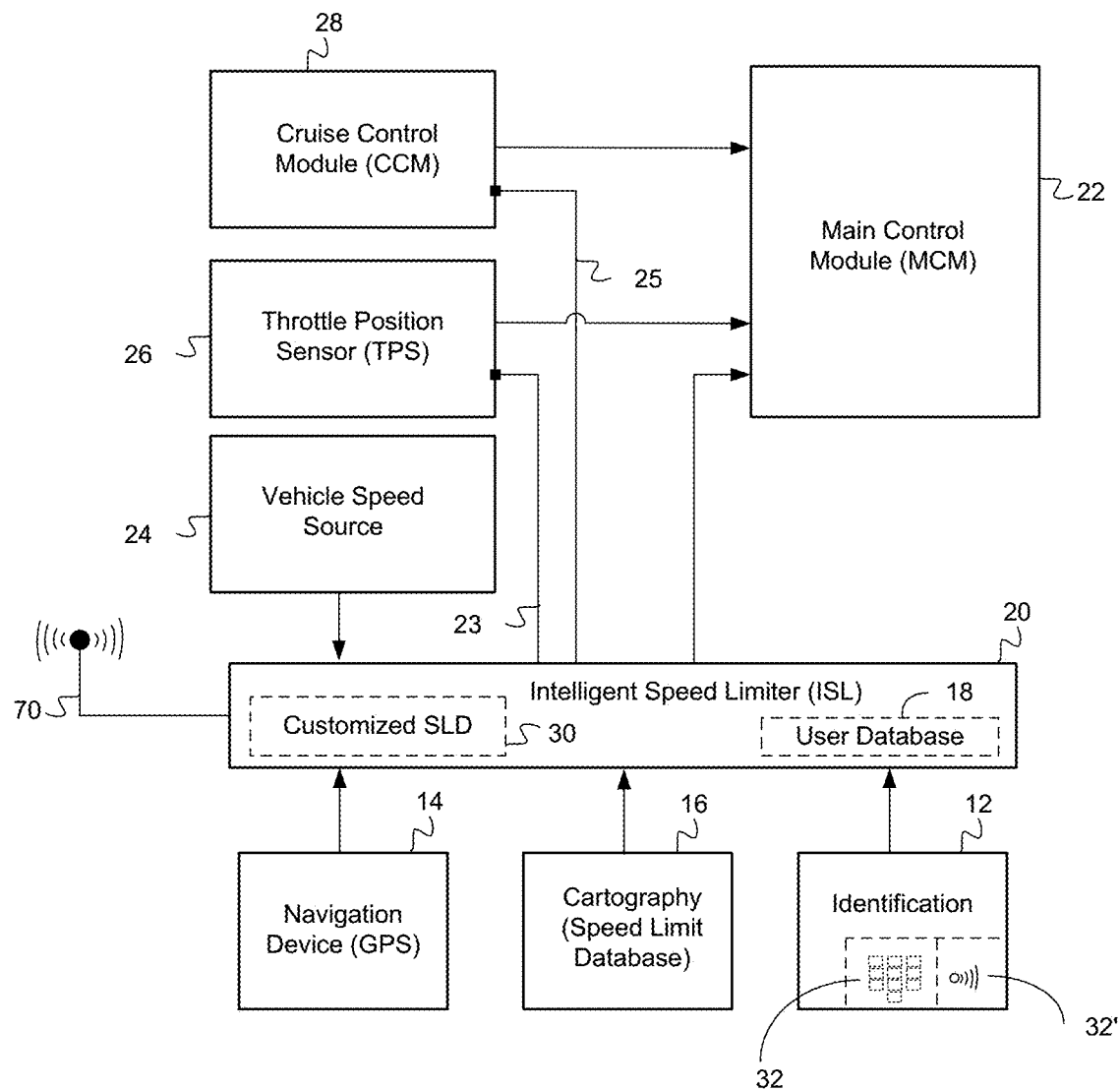
FIG. 2 is a schematic illustration of an embodiment of a prior art ISA system in accordance with the disclosure of the '133 Patent.

A difference that will first be noted is that the ISL module 20 in FIG. 4 does not control the cruise control module 28 and the signals that are sent from the cruise control module 28 to the MCM, which is done in the ISA system of FIG. 2. Nor is the cruise control module 28 separately connected to the ISL module 20 like in the ISA system of FIG. 3. Instead, the cruise control module 28 in FIG. 4 is connected to the data bus of the controller area network of the vehicle for communication via the data bus with the main control module 22.

Another difference is the inclusion of a controller or "simulating" controller 120 that mimics or simulates braking by a driver of the vehicle to the main control unit. In particular, the controller 120 may be communicatively coupled to the vehicle speed source 24 via the controller area network whereby a current speed of the vehicle is determined by the controller 120. This is schematically indicated by dashed line 27. Preferably, however, the vehicle speed is obtained by the controller 120 from the ISL module 20, as indicated by line 29. The currently allowed speed limit also preferably is obtained or otherwise determined by the controller 120 from information acquired from the ISL module 20. The controller 120 also monitors the data bus for whether the cruise control module 28 is active and cruise control is currently engaged. In some alternatives, the ISL module determines whether the vehicle is speeding and informs the simulating controller 120. In any case, when the simulating controller 120 determines that the cruise control is engaged and that the current speed of vehicle is within a range of or exceeds the currently allowed speed, the simulating controller 120 causes one or more signals to be sent to MCM 22, which one or more signals indicate to the MCM 22 that the brakes are being applied by the driver, thus simulating driver braking. This mimicking of driver braking results in consequent disengagement by the MCM 22 of the cruise control. Due to the operation of the simulating controller 128, the ISL module 20 is able to operate in a mode corresponding to operation as if there were no cruise control module 28. Nor is the resulting effectiveness of the ISL module 20 impacted by the presence and operation of the cruise control module—a benefit of the embodiment of the present invention for FIG. 4.

Figure 5:
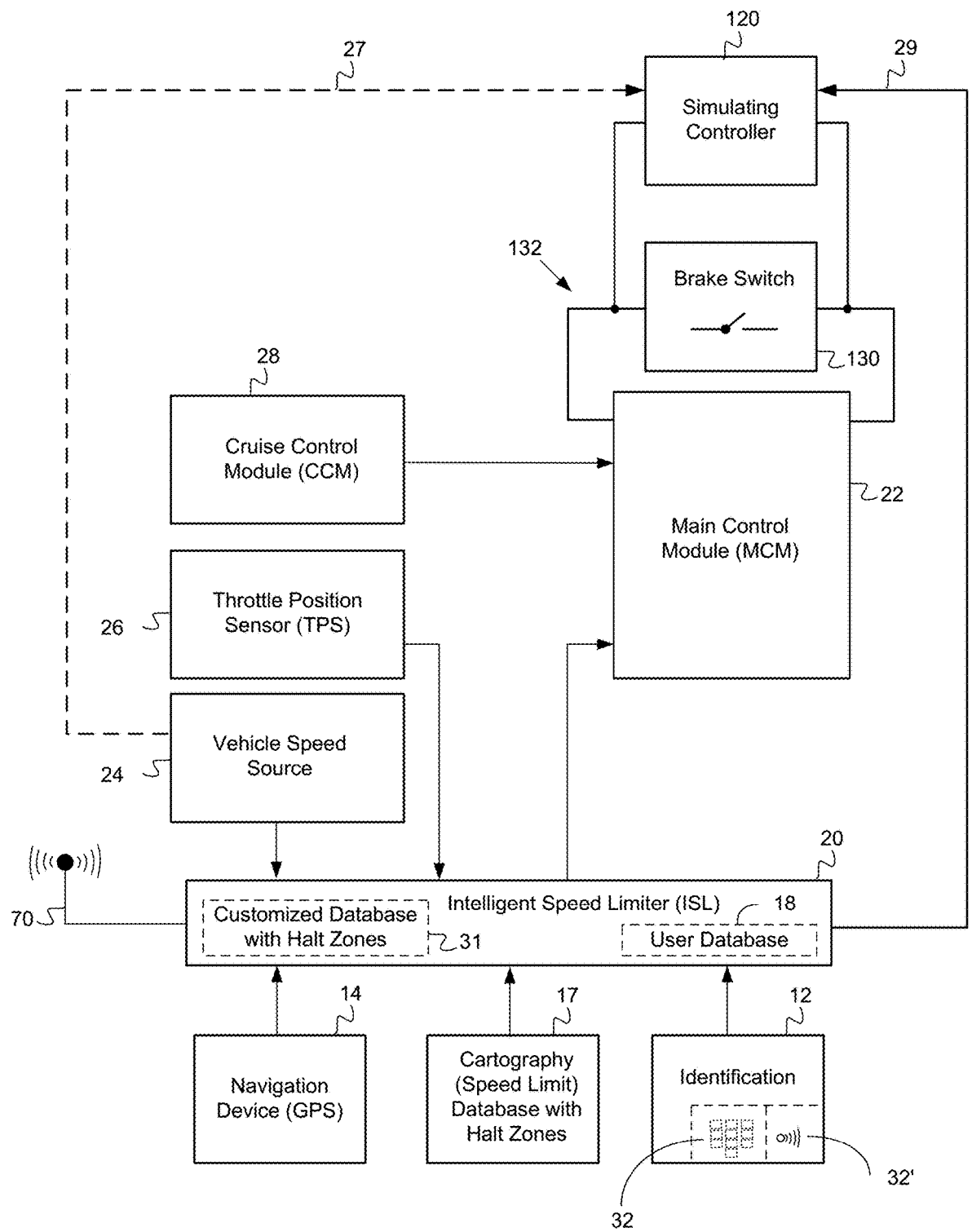
FIG. 5 is a schematic illustration of another embodiment of an ISA system that may be utilized in accordance with one or more aspects and features of the present invention.

FIG. 5 is a schematic illustration of another embodiment in accordance with one or more aspects and features of the present invention. The embodiment of FIG. 5 includes many of same elements as that of FIG. 4 and principally differs in the arrangement of the throttle position sensor 26 relative to the ISL module 20. Specifically, this arrangement of the throttle position sensor 26 and ISL module 20 corresponds to that of FIG. 3. The arrangement of the throttle position sensor 26 and ISL module 20 of FIG. 2 similarly corresponds to that of FIG. 4.

Figure 6:
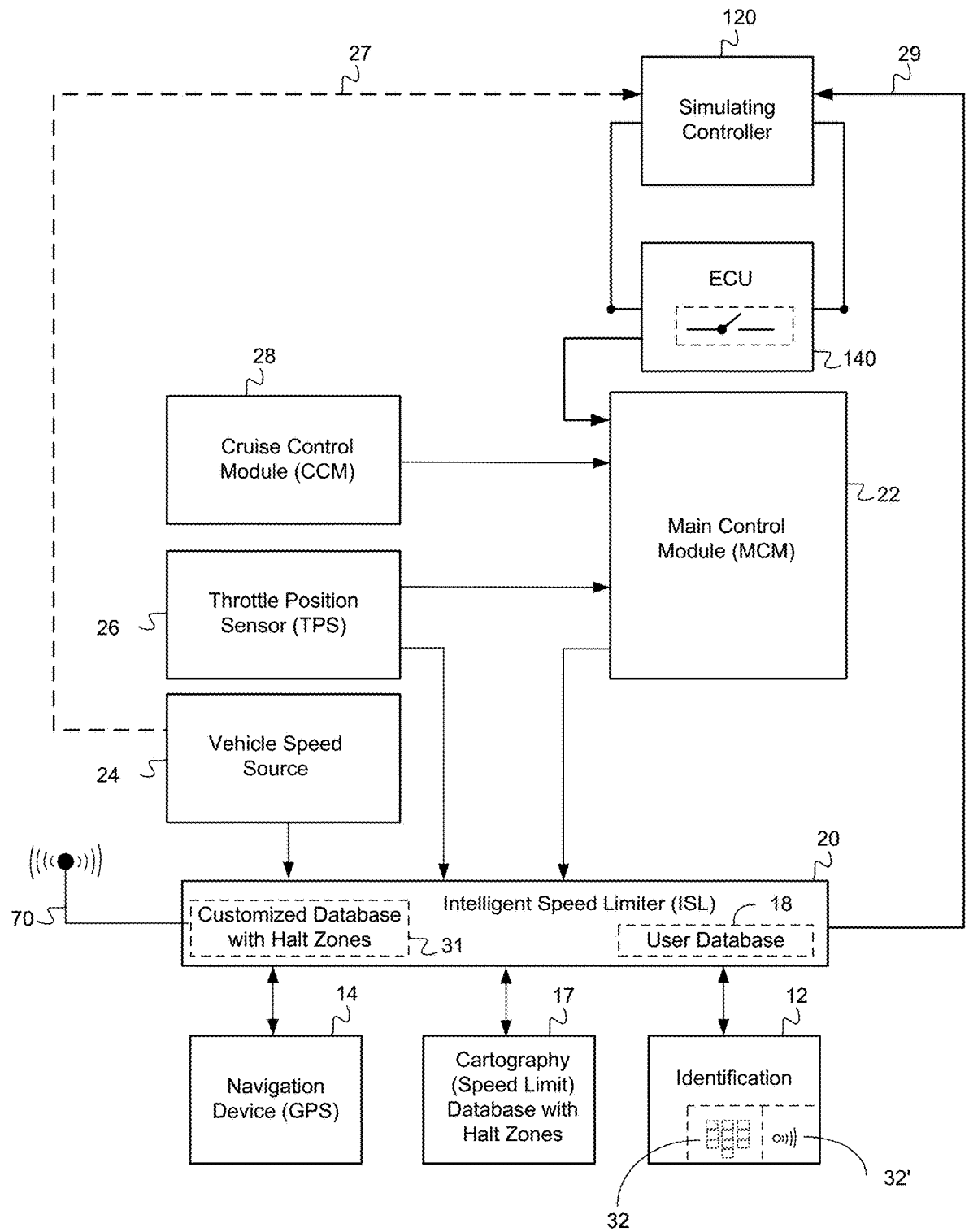
FIG. 6 is a schematic illustration of yet another embodiment of an ISA system that may be utilized in accordance with one or more aspects and features of the present invention.

Continuing on with reference to the arrangement between the throttle position sensor 26 and ISL module 20, the arrangement of FIG. 6 is similar to that of FIG. 5. The embodiment of FIG. 6 in accordance with one or more aspects and features of the present invention differs from that of FIGS. 4 and 5 in how the simulating controller 120 simulates braking by the driver. In particular, in each of the foregoing embodiments described in connection with FIGS. 4-5, the simulating controller preferably bypasses operation of a brake switch of the vehicle. This is done by connecting the simulating controller in parallel with a circuit of brake switch 130 such that the simulating controller 120 closes the brake switch circuit 132 causing a signal to be generated indicating braking even though the brake switch 130 may not be in a closed position so as to complete the circuit 132 itself. The brake switch circuit 132 is connected to the MCM 22 whereby closing of the brake switch circuit 132 signals the MCM 22 that the driver is applying the brakes. Preferably the simulating controller 120 will maintain the closed circuit with current flowing therethrough so long as the simulating controller 120 determines that speeding is occurring. During the simulated braking, the MCM 22 also preferably causes the brake lights to be illuminated, too. In contrast, in the embodiment of FIG. 6 the simulating controller 120 interacts with the brake switch through ECU 140 which itself is communicatively coupled with the MCM 22 via the data bus of the controller area network.

Operation of the ISA systems represent in FIGS. 4, 5, and 6 is described in the incorporated disclosures of the provisional applications. Operation of these ISA system with regard to halt zones in accordance with aspects and features of the invention is now described.

In particular, another difference in the embodiment of each of the ISA systems of FIGS. 4, 5, and 6 over those of FIGS. 2 and 3 is that these ISA systems each includes a cartography database 17 having not only speed limits for speed zones, but further having defined halt zones. Similarly, a customized cartography database 31 optionally is included that has speed limits for speed zones and that has defined halt zones. The halt zones preferably represent geofenced areas that are defined by GPS coordinates, which are used in the ISA system to determine when the vehicles enters a halt zone, whereupon the ISA system causes the vehicle to decelerate and essentially come to a halt. The halt zones may represent a layer that is part of the mapping data of a navigation system of the vehicle.

Figure 7:
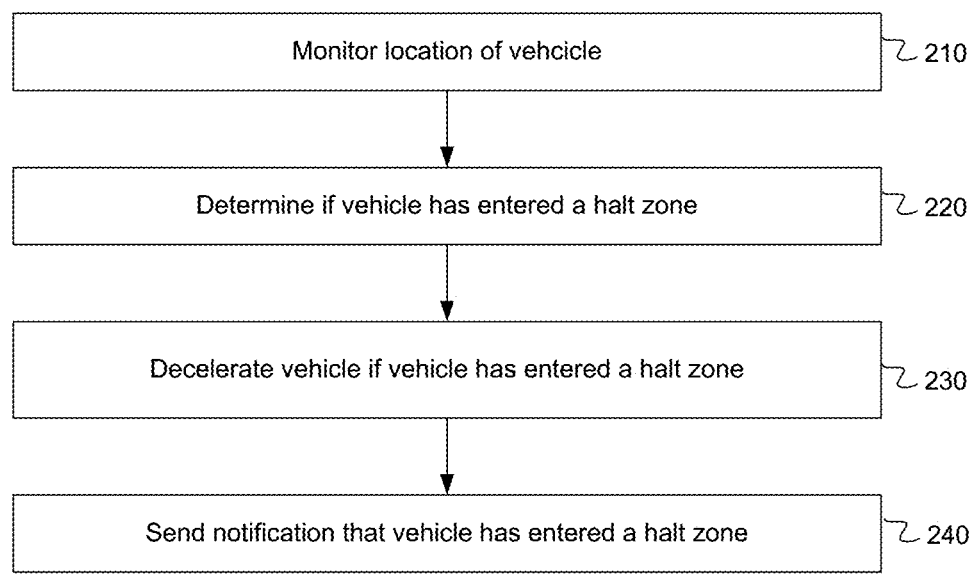
FIG. 7 is a schematic illustration of a sequence of steps that are performed in accordance with one or more aspects and features of the present invention.

In this respect, a sequence of steps is illustrated in FIG. 7, which steps are representative of an embodiment of a method in accordance with one or more aspects and features of the present invention which method preferably is performed by the ISA systems of FIGS. 4, 5, and 6. In step 210 a location of a vehicle at routine intervals is monitored while the vehicle is traveling along a road. This is done by determining the GPS coordinates of the vehicle. This information is compared to halt zones and, specifically, GPS coordinates defining halt zone boundaries (e.g. a geofenced area) to determine in step 220 if the vehicle as entered a halt zone, i.e., determine if the vehicle is within the geofenced area that defines the halt zone. If the vehicle is determined to have entered a halt zone, then in step 230 the vehicles is decelerated. Deceleration of the vehicle preferably is accomplished by limiting a speed of the vehicle to a nominal speed using the ISA system.

The database 17 or additional database 31 preferably define a plurality of halt zones. These halt zones may represent, for example, areas of roads leading up to overpasses or tunnels having a height that is less than the height of the vehicle; areas of roads leading up to narrow passes having a width that is less than a width of the vehicle; areas of roads leading up to curves having a radius of curvature that cannot be navigated by the vehicle due to the vehicle's length; and areas of roads leading up to bridges that have a weight limit that is less than a weight of the vehicle. The halt zones additionally may represent a vehicular path located adjacent a government building, such as a courthouse, or an area of an airport or an area of a military base. The halt zone further may be a pedestrian way, such as a sidewalk or bridge, or former road that has been closed to traffic.

The nominal speed preferably is a speed in name only and may be, for example, a speed that results from disengagement and nonoperation of the accelerator of the vehicle; 1 kilometer per hour; 1 mile per hour; 5 miles per hour or less; a speed that corresponds to idling of the engine; or a speed at which the vehicle, when under heavy load, will not advance forward. Further, if allowed in the ISA system, the nominal speed to which the speed is set may be 0 miles per hour or 0 kilometers per hour.

The vehicle may be an automobile or an electric vehicle. In preferred embodiments, the vehicle is a commercial vehicle (including a class 8 vehicle) and may be in the form of a delivery truck or semitruck that is part of a fleet. When the vehicle is part of a fleet, the vehicle preferably is also immobilized after entering a halt zone, and a notification preferably is sent to a manager of the fleet notifying the manager that the vehicle entered the halt zone. The notification preferably comprise a text message, and email, or both.

Figure 8:
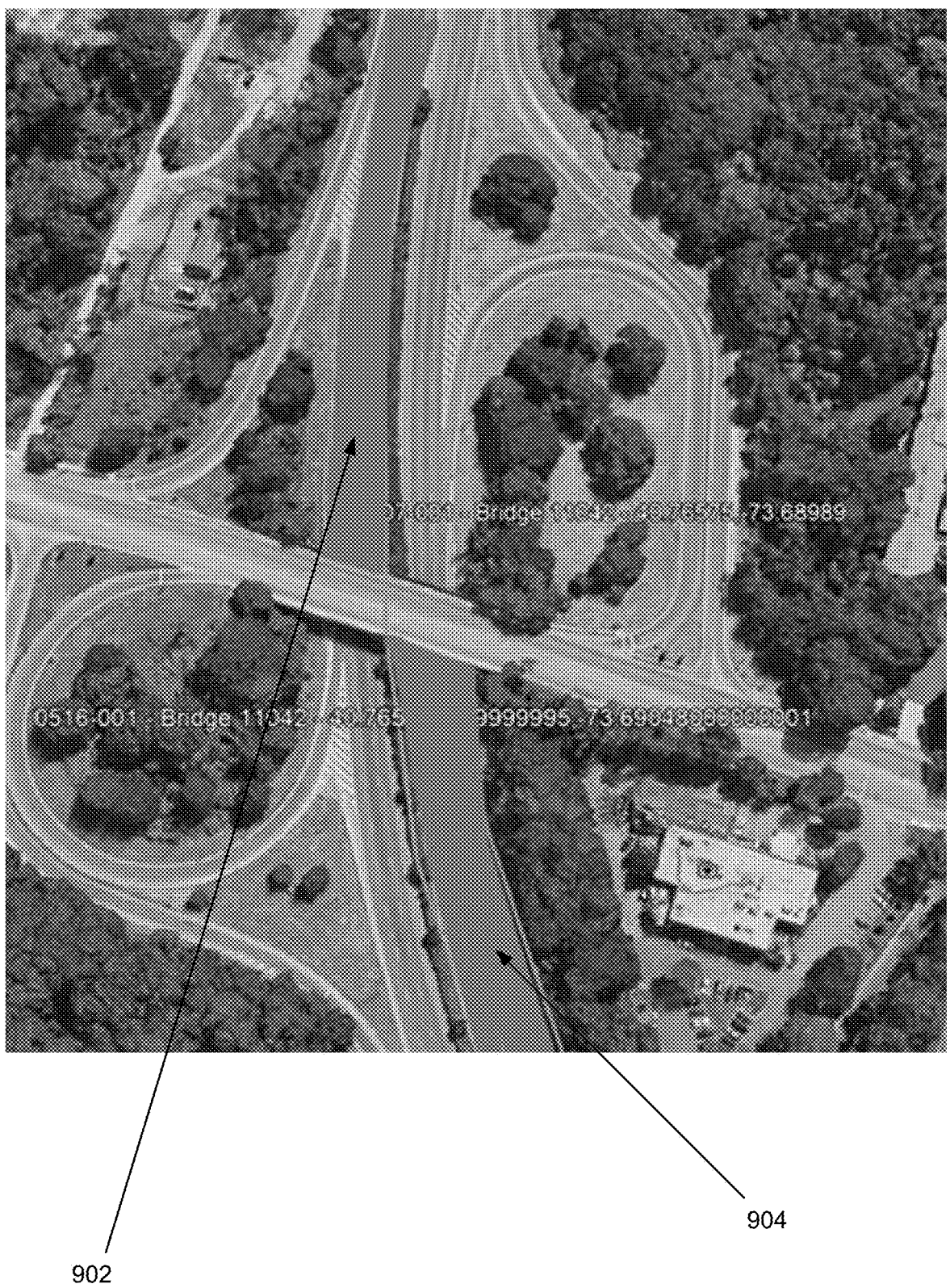
FIG. 8 is an illustration of two halt zones 902, 904 each leading up to an overpass on a highway or interstate.

FIG. 8 is an illustration of two halt zones 902, 904 each leading up to an overpass on a highway or interstate. Halt zone 902 is approximately 1000 feet of the road in the lanes of travel toward the overpass in a first direction of travel along the highway, and halt zone 904 is approximately 1000 feet of the road in the lanes of travel toward the overpass in a second direction of travel along the highway. A vehicle entering either of these halt zones 902, 904 will decelerate to a halt in accordance with embodiments of one or more preferred aspects and features of the invention, thereby minimizing or avoiding altogether a collision of the vehicle with the overpass.

Figure 9:
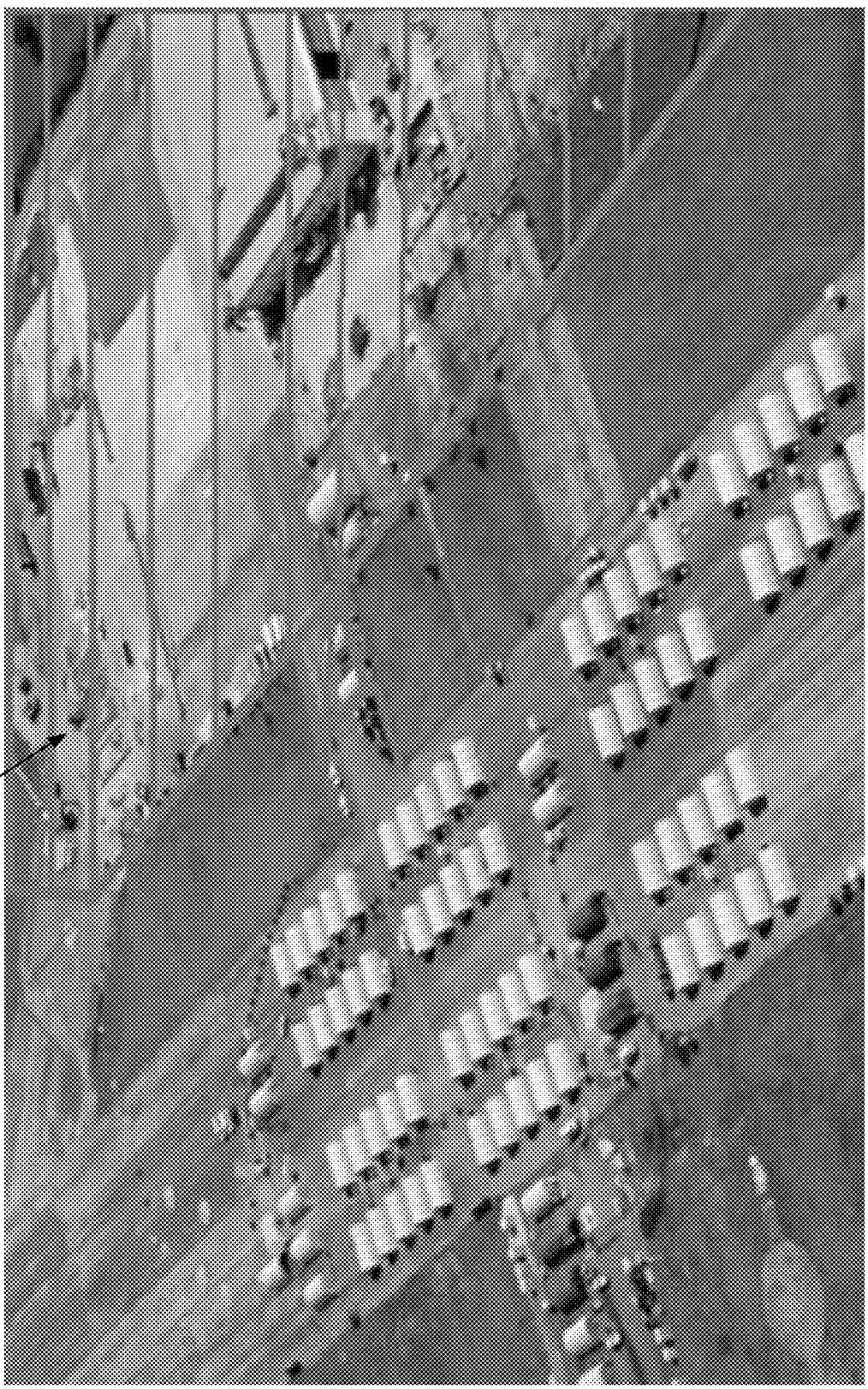
FIG. 9 is an illustration of a halt zone 906 at a military base.

FIG. 9 is an illustration of a halt zone 906 at a military base.

Figure 10:
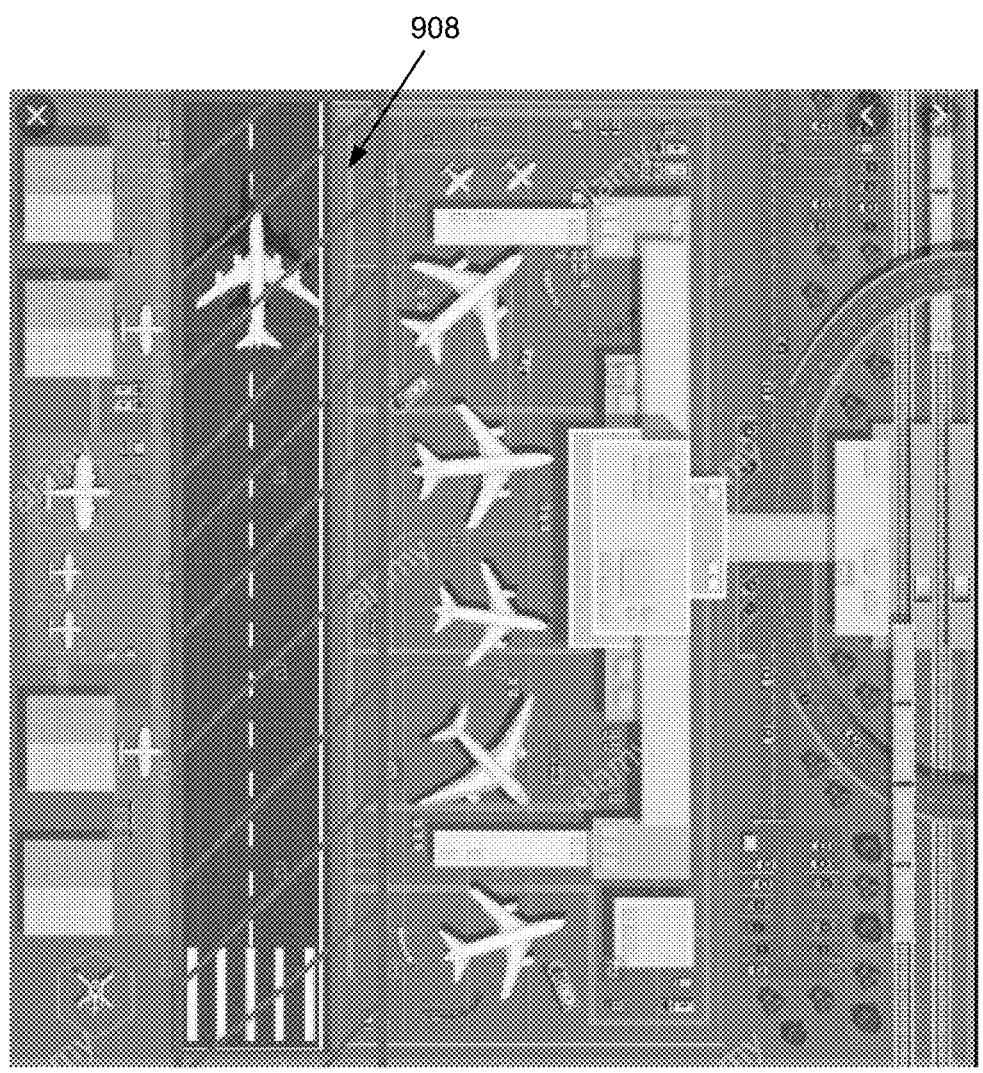
FIG. 10 is an illustration of a halt zone 908 at an airport.

FIG. 10 is an illustration of a halt zone 908 at an airport, wherein the halt zone 908 comprises a runway and tarmac.

From the foregoing, it will be appreciated that embodiments of the present invention provide many benefits and advantages.

Based on the foregoing description, it will be readily understood by those persons skilled in the art that various embodiments of the present invention have broad utility and application. For example, for fleets that operate heavy duty vehicles and class 8 tractors, and pull fifty-three footlong trailers, avoiding roads that lead to bridges that are less than thirteen and one-half feet in height is very important. A collision with a low bridge is very costly to fleets: downtime, tractor and trailer repair, repair of infrastructure can cost over one-hundred thousand U.S. dollars. Still, it is believed that hundreds of such collisions occur each year, in part because even though some telematics service providers display routes that avoid these bridges, drivers still choose not to follow suggested routes and end up using non-commercial roads or roads that do not allow for heavy duty vehicles. By actively removing the ability to traverse such roads, embodiments of the invention reduce the severity of or avoid altogether such a collision.

Moreover, the value provided by embodiments of the invention from security relating to government buildings, airports, pedestrian ways, and other areas can be priceless. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A vehicle, comprising an intelligent speed adaptor (ISA) system configured to:
   (a) determine a maximum speed based on a currently allowed speed for a speed zone of a road along which the vehicle is traveling;
   (b) limit traveling of the vehicle through the speed zone to the determined maximum speed, whereby the vehicle does not exceed a safe speed while traveling along the road within the speed zone;
   (c) determine that the vehicle has entered a halt zone based on a location of the vehicle being within a geofenced area; and
   (d) limit traveling of the vehicle to a nominal speed upon determining that the vehicle has entered the halt zone.

2. The vehicle of claim 1, wherein the ISA system is configured to use GPS coordinates of the vehicle and wherein the geofenced area is defined by GPS coordinates, whereby the ISA system determines that the vehicle has entered the halt zone.

3. The vehicle of claim 1, wherein the geofenced area corresponds to an area along a road that leads to an overpass which the vehicle is unable to traverse, whereby damage or injury from a collision of the vehicle with the overpass may be prevented or at least mitigated.

4. The vehicle of claim 1, wherein the geofenced area corresponds to an area along a road that leads to a low-clearance structure, whereby damage or injury from a collision of the vehicle with the lower-clearance structure may be prevented or at least mitigated.

5. The vehicle of claim 1, wherein the geofenced area corresponds to an area along a road that leads to an overpass.

6. The vehicle of claim 1, wherein the geofenced area corresponds to an area along a road that leads to a tunnel.

7. The vehicle of claim 1, wherein the ISA system limits traveling of the vehicle to a nominal speed by preventing signals indicating an acceleration from being sent to a main control module comprising an engine control unit of the vehicle.

8. The vehicle of claim 1, wherein the ISA system limits traveling of the vehicle to a nominal speed by preventing signals sent in response to depression of an acceleration pedal from being received by an engine control unit of the vehicle.

9. The vehicle of claim 1, wherein the ISA system limits traveling of the vehicle to a nominal speed by modifying signals that are sent in response to depression of an acceleration pedal to an engine control unit of the vehicle.

10. The vehicle of claim 1, wherein the ISA system limits traveling of the vehicle to a nominal speed by preventing signals sent by a throttle position sensor from being received by an engine control unit of the vehicle.

11. The vehicle of claim 1, wherein the ISA system limits traveling of the vehicle to a nominal speed by modifying signals sent by a throttle position sensor to an engine control unit of the vehicle.

12. The vehicle of claim 1, wherein the ISA system limits traveling of the vehicle to a nominal speed by sending commands to an engine control unit of the vehicle setting the vehicle's top speed governor to the nominal speed.

13. The vehicle of claim 1, wherein the ISA system limits traveling of the vehicle to a nominal speed by disengaging an acceleration pedal of the vehicle.

14. The vehicle of claim 1, wherein the ISA system limits traveling of the vehicle to a nominal speed by signaling an engine control module of the vehicle that the accelerator is not depressed.

15. The vehicle of claim 1, wherein the ISA system further is configured to actuate brakes of the vehicle for active braking of the vehicle rather than engine braking of the vehicle.

* * * * *